United States Patent
Longcroft

(10) Patent No.: US 11,053,376 B2
(45) Date of Patent: Jul. 6, 2021

(54) BIODEGRADABLE COATINGS FOR BIODEGRADABLE SUBSTRATES

(71) Applicant: James Henry Stoddart Longcroft, London (GB)

(72) Inventor: James Henry Stoddart Longcroft, London (GB)

( * ) Notice: Subject to any disclaimer, the term of this patent is extended or adjusted under 35 U.S.C. 154(b) by 0 days.

(21) Appl. No.: 16/980,545

(22) PCT Filed: Mar. 18, 2019

(86) PCT No.: PCT/GB2019/050752
§ 371 (c)(1),
(2) Date: Sep. 14, 2020

(87) PCT Pub. No.: WO2019/175610
PCT Pub. Date: Sep. 19, 2019

(65) Prior Publication Data
US 2021/0002458 A1    Jan. 7, 2021

(30) Foreign Application Priority Data

Mar. 16, 2018 (GB) .................................... 1804218

(51) Int. Cl.
*C08L 7/00* (2006.01)
*C09D 107/00* (2006.01)

(52) U.S. Cl.
CPC .............. *C08L 7/00* (2013.01); *C09D 107/00* (2013.01); *C08L 2201/06* (2013.01)

(58) Field of Classification Search
CPC ...... C08L 7/00; C08L 2201/06; C09D 107/00
USPC ....................................................... 523/100
See application file for complete search history.

(56) References Cited

U.S. PATENT DOCUMENTS

| | | | |
|---|---|---|---|
| 3,819,772 A * | 6/1974 | Kolobow | B01D 69/12 264/424 |
| 2004/0105941 A1* | 6/2004 | Terada | B65D 3/22 428/34.2 |
| 2005/0089606 A1 | 4/2005 | Dellinger et al. | |
| 2005/0246949 A1 | 11/2005 | Girard et al. | |
| 2008/0221246 A1 | 9/2008 | Imam et al. | |
| 2010/0236972 A1* | 9/2010 | Aoki | C08J 5/045 206/524.7 |
| 2013/0085571 A1* | 4/2013 | Mueller | A61L 27/54 623/15.12 |

FOREIGN PATENT DOCUMENTS

| | | |
|---|---|---|
| DE | 19945193 A1 | 3/2001 |
| EP | 1418272 A1 | 5/2004 |
| JP | 2001-115122 A | 4/2001 |
| JP | 2001-288295 A | 10/2001 |
| JP | 2002-238360 A | 8/2002 |
| JP | 2010-106051 A | 5/2010 |

OTHER PUBLICATIONS

Shah, Aamer Ali, et al. "Biodegradation of natural and synthetic rubbers: A review." *International biodeterioration & biodegradation* 83 (2013): 145-157.

International Search Report and Written Opinion dated Jun. 17, 2019 for International Application No. PCT/GB2019/050752, 9 pages.

* cited by examiner

*Primary Examiner* — Hui H Chin
(74) *Attorney, Agent, or Firm* — Frost Brown Todd LLC

(57) ABSTRACT

Biodegradable linings can be easily applied to a range of materials, to provide a waterproof coating, and are thus suitable for lining containers such as bottles used for food stuffs and personal care compositions. The biodegradable linings undergo rapid biodegradation under ambient conditions to afford environmentally benign decomposition products.

20 Claims, 2 Drawing Sheets

VACUUM

BIODEGRADABLE COATINGS FOR BIODEGRADABLE SUBSTRATES

TECHNICAL FIELD

This disclosure relates to a water-resistant, or waterproof, biodegradable composition for use in coating biodegradable substrates such as containers. This disclosure also relates to methods of applying a water-resistant, or waterproof, biodegradable composition to biodegradable substrates.

BACKGROUND

An estimated 8.3 billion tonnes of virgin plastic has been produced to date, resulting in approximately 6.3 billion tonnes of plastic waste. Current estimates predict 12 billion tonnes of plastic waste will be in landfills or the environment by 2050. The majority of the plastics currently in use are petrochemically-derived and can have biodegradation rates ranging from the 10s to the 1000s of years. Furthermore, when plastic articles enter the ocean, biodegradation into microplastic particles occurs, which can then be consumed by fish and other organisms, and therefore enter the food chain.

The scale of the problem facing the world's oceans and ecosystems is coming into focus. Schemes that reduce the amount of single use plastic articles and/or that promote recycling of such articles can contribute to reducing waste estimates. However, whilst petrochemically-derived plastics (e.g. polyolefins such as polyethylene (PE), polypropylene (PP), or polyesters such as polyethylene terephthalate (PET)) are still in common usage, problems associated with their disposal and biodegradation, should they find themselves in the environment, will persist.

There is therefore a need for biodegradable materials that can be employed in the production of articles currently made of plastic, particularly petrochemically-derived plastics. These replacement materials should ideally be sustainably-sourced, be readily biodegradable under ambient conditions and at a rate suitable for composting, and breakdown into non-toxic decomposition products.

The present invention addresses these issues by providing an alternative material that can be used as a replacement to plastics, and can therefore find use in the manufacture of containers for food stuffs, personal care and cleaning products.

BRIEF DESCRIPTION OF THE DRAWINGS

Embodiments of the invention will be described, by way of example, with reference to the following drawing, in which.

SUMMARY

Figure 1:
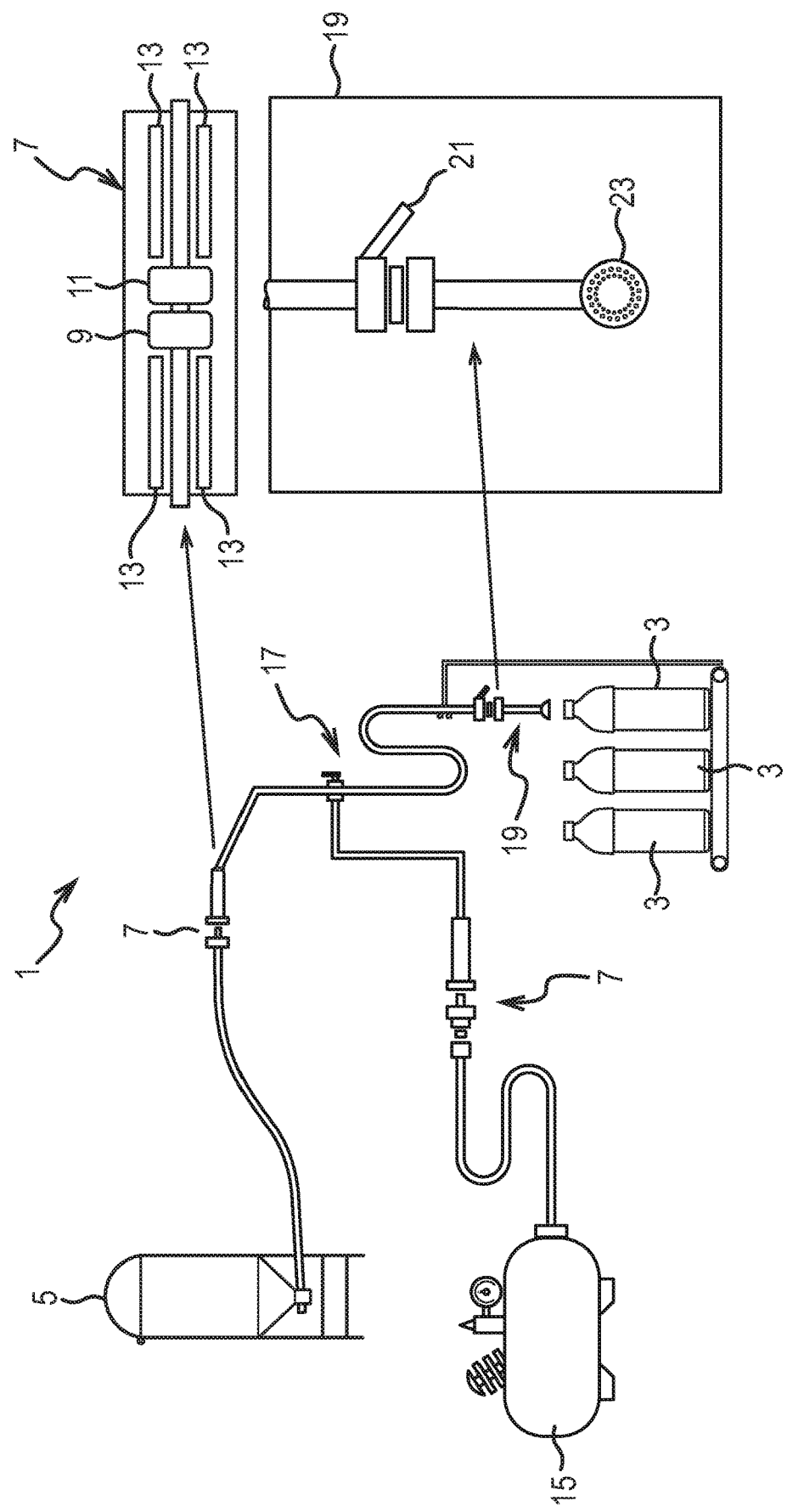
FIG. 1 shows a schematic of an apparatus used in the method of the invention for applying the aqueous rubber dispersion of the invention to a biodegradable bottle.
Figure 2:
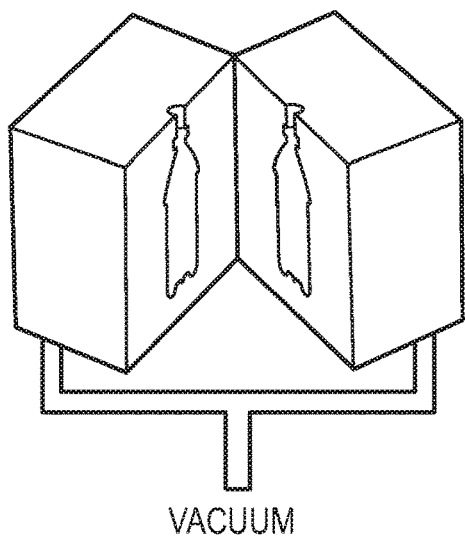
FIG. 2 shows a diagrammatic view of a first embodiment of a mould for use in the method of the invention.
Figure 3:
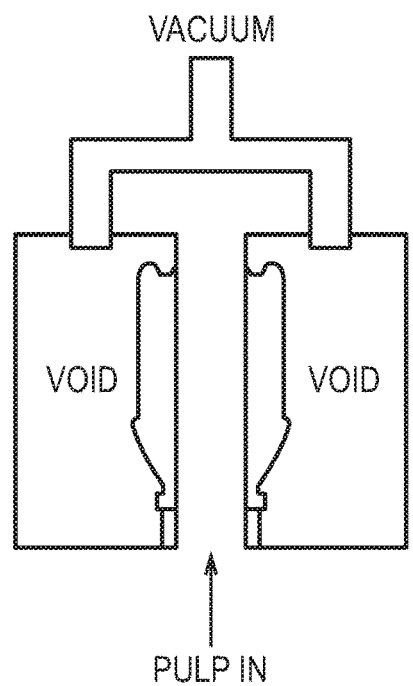
FIG. 3 shows a diagrammatic view of a second embodiment of a mould for use in the method of the invention.
Figure 4:
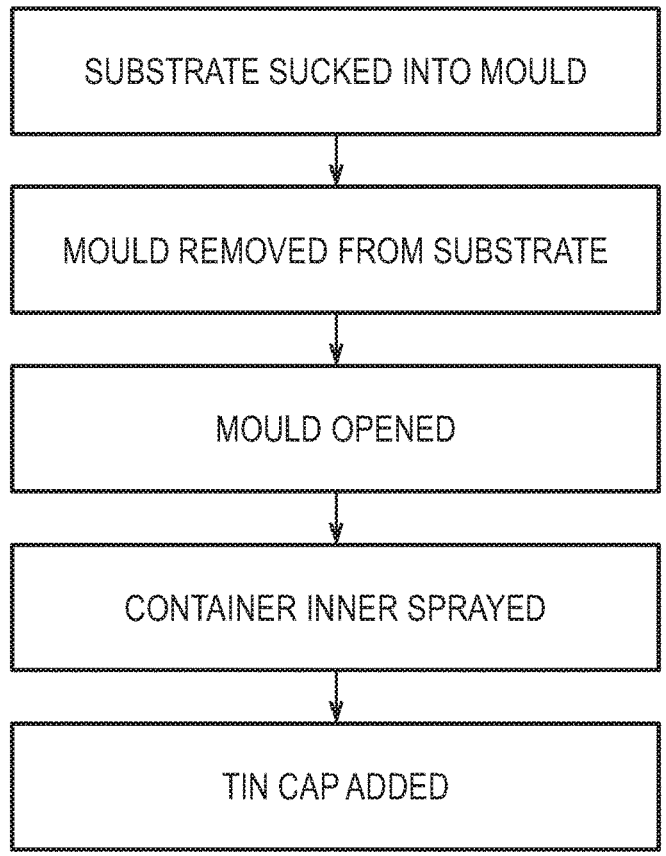
FIG. 4 shows a diagrammatic flow chart of a method for making the bottles of the invention.

In one aspect of the invention there is provided a composition comprising a rubber and at least one additive that promotes biodegradation of rubber.

In another aspect of the invention there is provided a fibrous substrate comprising at least one surface, wherein the at least one surface comprises a layer of coating comprising a composition comprising a rubber and at least one additive that promotes biodegradation of rubber.

In another aspect of the invention there is provided a biodegradable container comprising a structural layer, wherein the structural layer comprises a fibrous substrate comprising at least one surface, where in the at least one surface comprises a layer of coating comprising a composition comprising a rubber and at least one additive that promotes biodegradation of rubber.

In another aspect of the invention there is provided an aqueous rubber dispersion comprising a composition comprising a rubber and at least one additive that promotes biodegradation of rubber.

In another aspect of the invention there is provided a method of making an aqueous rubber dispersion, comprising:
 a) dispersing at least one additive that promotes biodegradation of rubber in water; and
 b) adding rubber to the product of a) and stirring.

In another aspect of the invention there is provided a method of coating a fibrous substrate with a composition comprising a rubber and at least one additive that promotes biodegradation of rubber, comprising:
 a) providing a fibrous substrate with at least one surface;
 b) depositing an aqueous rubber dispersion comprising a composition comprising a rubber and at least one additive that promotes biodegradation of rubber on the at least one surface to form a layer of coating; and
 c) drying the fibrous substrate and layer of coating

DETAILED DESCRIPTION

Unless otherwise stated, all weight percentages (wt %) are given relative to the total weight of all the components present (e.g. the mass of all the components in the composition or in the aqueous rubber dispersion).

References to "in one embodiment" or "in an embodiment" means that a particular feature, structure, or characteristic described in connection with the embodiment is included in at least one embodiment. Thus, the appearance of the phrases "in one embodiment" or "in an embodiment" in various places throughout the specification are not necessarily all referring to the same embodiment. Furthermore, the particular features, structures, or characteristics may be combined in any suitable manner in one or more embodiments.

By biodegradable, it is meant the breakdown of organic matter by microorganisms such as bacteria and fungi, to afford small molecule and/or gaseous by-products. By ambient conditions, it is meant conditions typical to the natural world, for example temperatures between 5 and 45° C., such as between 10 and 35° C., 18 and 30° C., or 20 and 28° C., and pressures around atmospheric pressure (101 kPa), such as between 60 and 106 kPa, such as 80 and 101 kPa, or 95 to 101 kPa, or about 101 kPa. Furthermore, ambient conditions may include both aerobic (in the presence of oxygen) and anaerobic (in the absence of oxygen) conditions, in addition to conditions in the presence or absence of light, and conditions in the presence or absence of moisture.

Methods for measuring the rate of biodegradation are known in the art. For example, the biodegradation half-life can be calculated for the composition/fibrous substrate/container of the invention. The biodegradation half-life is the time at which the weight of the composition/fibrous substrate/container has been reduced by half, i.e. half of the composition has undergone biodegradation to afford gaseous by-products.

By rates of biodegradation suitable for composting, it is meant that the item in question will undergo biodegradation in ambient conditions with a half-life of less than one year, such as less than 10 months, less than 6 months, less than 3 months, or less than one month.

By composting, it is meant any situation wherein the item is exposed to sources of microorganisms and conditions suitable for decomposing the item. For example, composting in the context of the present application includes disposing the composition/fibrous substrate/container of the invention in landfills, compost heaps, bio-reactors, recycling plants, as well as the natural environment, including bodies of water such as lakes, rivers, seas, or sites on/in land such as hedgerows, fields, or gardens.

By food safe, it is meant that the components to which the term refers have been deemed to be non-toxic and safe for human consumption. Such components typically have approval from regulatory bodies such as the European Food Safety Authority (EFSA), or the Food and Drug Administration (FDA), or the German BGA. These bodies set regulations concerning the use of, among other things, rubbers, and additives, for use in food-contact applications. For example, the BGA demands that rubber articles are unobjectionable in aspects of health, smell, and taste. The BGA provide a list of Recommendations XXI, which place the responsibility of manufactures to prove that their products do not harm consumers. The rubber in the compositions, dispersions, and containers of the invention is preferably Category 1 in the BGA Recommendations XXI.

By sustainably-sourced it is meant that the entire supply chain used in the production is known to use sustainable practices, wherein sustainable practices are defined as those practices that can be continued indefinitely without adversely affecting the environment. It will be understood that the terms "degradation" such as "biodegradation", and "decomposition" can be used interchangeably.

By fibrous substrate, it is meant materials composed from fibres, such as cellulosic fibres. The present invention is directed towards biodegradable linings for biodegradable containers, such that a fibrous substrate when discussed in the context of the invention will typically be a biodegradable substrate, such as a cellulosic fibrous substrate. However, those skilled in the art will understand that the composition of the invention may also be applied to fibrous substrates made from other materials, including wool or synthetic fibres.

Rubber Composition

The present invention provides a composition comprising a rubber and at least one additive that promotes the biodegradation of rubber. In one embodiment of the invention, the at least one additive that promotes biodegradation of rubber is a polysaccharide, such as methyl cellulose and/or xanthan gum. In one embodiment of the invention the composition further comprises an emulsifying agent, such as emulsifying wax. In one embodiment of the invention, the composition further comprises a vegetable oil. In one embodiment of the invention, all the components of the rubber composition are sustainably sourced.

In one embodiment of the invention, the composition comprises rubber in an amount between 65 and 95 wt %, at least one polysaccharide in an amount between 2 and 18 wt %, and optionally an emulsifying wax in an amount between 1 and 4 wt % and a vegetable oil in an amount between 4 and 14 wt %. In one embodiment of the invention, the composition comprises rubber in an amount between 75 and 85 wt %, at least one polysaccharide in an amount between 6 and 14 wt %, and optionally an emulsifying wax in an amount between 1.2 and 3.8 wt % and a vegetable oil in an amount between 6 and 12 wt %. In one embodiment of the invention, the composition comprises rubber in an amount between 78 and 82 wt %, at least one polysaccharide in an amount between 8 and 12 wt %, and optionally an emulsifying wax in an amount between 2 and 3 wt % and a vegetable oil in an amount between 8 and 10 wt %.

In one embodiment of the invention, the composition comprises rubber in an amount between 65 and 95 wt %, methyl cellulose in an amount between 1 and 9 wt %, xanthan gum in an amount between 1 and 9 wt %, and optionally an emulsifying wax in an amount between 1 and 4 wt % and a vegetable oil in an amount between 4 and 14 wt %. In one embodiment of the invention, the composition comprises rubber in an amount between 75 and 85 wt %, methyl cellulose in an amount between 3 and 7 wt %, xanthan gum in an amount between 3 and 7 wt %, and optionally an emulsifying wax in an amount between 1.2 and 3.8 wt % and a vegetable oil in an amount between 6 and 12 wt %. In one embodiment of the invention, the composition comprises rubber in an amount between 78 to 82 wt %, methyl cellulose in an amount between 4 and 6 wt %, xanthan gum in an amount between 4 and 6 wt %, and optionally an emulsifying wax in an amount between 2 and 3 wt % and a vegetable oil in an amount between 8 and 10 wt %.

In one embodiment of the invention, the composition comprises a ratio of rubber to polysaccharide of 95:2 to 65:18, such as 85:6 to 75:14, or 82:8 to 78:12. In one embodiment of the invention, the composition comprises a ratio of rubber to methyl cellulose of 95:1 to 65:9, such as 85:3 to 75:7, or 82:4 to 78:6. In one embodiment of the invention, the composition comprises a ratio of rubber to xanthan gum of 95:1 to 65:9, such as 85:3 to 75:7, or 82:4 to 78:6.

Rubber

Rubber is used in the compositions of the invention. The rubber provides a water-resistant, or waterproof, layer to the substrate to which it coats as rubber is known to be very hydrophobic. For instance, a rubber liner used as a lining of containers for foodstuffs and/or drinks and provide a barrier to moisture/liquid. Furthermore, the rubber can provide a gas barrier. Thus, substrates that may not be suitable for containing food stuffs (i.e. substrates that do not provide a sufficient barrier to air and moisture/liquid) can be coated with the rubber composition of the invention to provide a coated substrate suitable for containing food stuffs. For example, many fibrous biodegradable substrates, e.g. paper fibres, bamboo fibres, sugar cane fibres, which do not possess the required barrier properties for use as such containers can be coated with the composition of the invention.

The rubber for use in the composition of the invention is preferably non-crosslinked rubber or rubber with a low cross-link density. Highly cross-linked rubber, e.g. synthetic rubbers that have been vulcanised with sulfur or organic peroxides, have a high crosslink density and form very high molecular weight dense networks. Such rubbers require significant time periods (e.g. >50 years) to undergo complete biodegradation, even when utilising additives that promote biodegradation. The cross-link density of rubber can be calculated using methods known in the art.

Whilst any non-crosslinked rubber or rubber with a low-crosslink density could be utilised in the composition of the invention, natural rubber is preferred. Natural rubber is produced by over 2,000 plant species and has as a main constituent poly(cis-1,4-isoprene) having a molecular weight of 100 to 1,000 kDa. Examples of suitable natural rubbers include the rubbers produced by *H. brasiliensis* and Guayule rubber produced of *Parthenium argentatum*, both which are produced commercially. Natural rubber therefore has the further advantage of being non-petrochemically derived. The natural rubber for use with the invention is preferably unvulcanised. In a preferred embodiment, the rubber is unvulcanised guayule-derived natural rubber.

Those skilled in the art will appreciate that rubbers which are described as unvulcanised may still comprise a nominal degree of crosslinking. However, said degree of cross-linking will not significantly affect the biodegradation rate of the rubber.

Natural rubber is known to be extremely hydrophobic and therefore water-resistant, or waterproof, and can provide a good barrier to water. Furthermore, natural rubber is known to have good gas barrier properties to gases such as oxygen, and has an oxygen transmission rate (OTR) of about $10^{-12}$ $(cm^3(STP)\ cm)/(cm^2 \cdot s \cdot Pa)$. This is lower than synthetic rubber (OTR=$10^{-10}$ $(cm^3(STP)\ cm)/(cm^2 \cdot s \cdot Pa)$) and comparable to petrochemically-derived plastics commonly used as food-containers (e.g. low-density polyethylene (LDPE), polystyrene, polypropylene: OTR=$10^{-13}$ $(cm^3(STP)\ cm)/(cm^2 \cdot s \cdot Pa)$). STP=standard temperature and pressure. Natural rubber is therefore particularly well-suited for use in the linings of containers for food stuffs. In addition, those skilled in the art will appreciate that the linings made from the rubber composition of the invention will also be suitable for use in containers for personal care and/or cleaning products.

In one embodiment of the invention, the natural rubber is ML 200 pre-vulcanised latex, available from Formulated Polymer Products Ltd, Bury, Lancashire, UK.

Rubber can undergo biodegradation under ambient conditions affording a variety of biodegradation products, including $CO_2$, $H_2O$, methane, in addition to a number of small molecule by-products. The exact composition of the by-products may depend on environmental factors, such as the identity of microorganisms present, and the presence or absence of oxygen, i.e. whether aerobic or anaerobic biodegradation pathways are operative. Without wishing to be bound by theory, it is believed a principle biodegradation pathway of natural rubber involves the oxidative cleavage of the C=C double bond in the backbone of the polymer chain. It is believe that this process occurs in two-steps, with an initial abiotic oxidation followed subsequently by biodegradation by microorganisms.

The biodegradation of rubber, which has been extensively studied, involves microorganisms such as bacteria (e.g. *Streptomyces coelicolor, Pseudomonas citronellolis,* and *Nocardia* spp) and/or fungi comprising suitable enzymes, see Ali Shah, A. et al., *Int. Biodeter. Biodegr.*, 2013, 83, 145-147. However, even for unvulcanised natural rubber, the biodegradation process may be slow, requiring many months or years to completely biodegrade into biodegradation products.

Those skilled in the art will appreciate that a multitude of environmental factors may affect the rate of biodegradation, including the identity and number of microorganisms present and the availability of oxygen. For example, variation in the biodegradation rates has been observed for natural rubber latex gloves, which were buried in either tropical soils "amended" with nitrogen and phosphorus-containing compounds or a composting environment created from dried grass clippings, cattle manure, and soil ("un-amended" conditions). The tests found that when soils were amended to favour microbial growth (i.e. adding nitrogen and phosphorous-containing compounds), enhanced biodegradation rates were observed when compared to natural biodegradation processes in un-amended soil. Mean specific biodegradation rates of natural rubber gloves have been found to be three times faster in amended soil than in the un-amended soil.

It will also be appreciated that in the context of this application, where a relative change in the rate of biodegradation rates of rubber compositions is discussed, the changes in said rate are derived from the nature of the rubber composition itself and not through variation in the environmental factors to which the rubber composition is exposed. Thus, changes in biodegradation rate may result from the presence of additives, i.e. when comparing the same rubber composition with or without additives. However, those skilled in the art will appreciate that changes may also result from variation in chemical structure and/or physical properties of the rubber itself, e.g. when comparing different rubbers, such as variation in the type and number of functional groups present, variation in crystallinity, the presence and degree of crosslinking, and/or variation in molecular weight.

In one embodiment, the composition of the invention comprises rubber in an amount of between 65 to 95 wt % based on the total weight of the composition, such as between 70 and 90 wt %, 75 and 85 wt %, 78 and 82 wt %, or about 80 wt % based on the total weight of the composition.

Additive for Promoting Biodegradation of Rubber

The composition of the invention comprises at least one additive that promotes the biodegradation of rubber. By promoting the biodegradation of rubber, it is meant that, when present, said additives increase the rate of decomposition of rubber into decomposition products (i.e. it has a faster biodegradation half-life) relative to compositions not comprising said additives.

The additives undergo rapid decomposition in the presence of naturally-occurring microorganisms comprising suitable enzymes, e.g. cellulase, and are converted from polymeric species into biodegradation products, including low molecular weight species and gaseous by-products.

It is believed that the additives for use in the composition of the invention provide sites when microorganisms capable of biodegrading the additives can penetrate the rubber composition. Furthermore, these sites also allow microorganisms capable of metabolising rubber to colonise areas of the composition comprising the additive and initiate the biodegradation process of the rubber.

Once the additives have biodegraded, internal portions of the rubber composition will become exposed, which allows more microorganisms to enter the rubber composition, and thus the rate of biodegradation of the rubber is further increased. In other words, the additives for use in the composition of the invention provide "break points" in the rubber composition (e.g. coating/lining), which expedite the biodegradation of the rubber.

The inclusion of additives is particularly important for embodiments of the invention wherein the composition is in the form of a layer of coating on a fibrous substrate. In such embodiments, the layer of rubber coating comprises a surface which can act as a barrier to microorganisms entering the rubber coating layer and initiating biodegradation. By including additives in the composition of the invention, the additives are biodegraded when exposed to composting conditions and the barrier provided by coating layer surface is compromised. This increases the exposed surface area of the rubber, allowing more microorganisms to enter and biodegrade the rubber lining, expediting the process of biodegradation.

Coatings made from the composition of the present invention will undergo biodegradation faster than coatings made from synthetic rubbers, which comprise a high-crosslink density, and also coatings made from unvulcanised natural rubber that does not comprise the additives for use with the invention. For example, the coatings of the invention may have biodegradation half-lives that are at least 10% faster than coatings comprising unvulcanised natural rubber without the additives for use with the invention, such as at least 20%, at least 30%, at least 40%, or at least 50% faster than coatings comprising unvulcanised natural rubber without the additives for use with the invention. Containers comprising the coating of the invention have improved biodegradation rates suitable for composting.

The additives for use with the invention have certain characteristics that allow them to perform their function in the compositions of the invention. In one embodiment of the invention, the additives are polysaccharides, including xanthan gum, cellulose and its derivatives such as methyl cellulose, ethyl cellulose, hydroxyethyl cellulose, or cellulose acetate, starches such as amylose or amylopectin, hemicellulose, glycogen, pectin, or combinations thereof. In one embodiment of the invention, the at least one additive comprises a mixture of a cellulose and xanthan gum. In a preferred embodiment of the invention, the at least one additive comprises a mixture of methyl cellulose and xanthan gum.

Polysaccharides are amenable to biodegradation from a variety of naturally-occurring and abundant microorganisms. Furthermore, the additives are polymeric, which mean that they contribute to the structural integrity of the lining whilst the product is in use (i.e. before the product is composted and exposed to microorganisms in the environment).

The additives for use in the invention are may be moderate or high molecular weight polymeric species, that can contribute to the structural integrity of the bottle, but that also undergo rapid depolymerisation once composted to provide low molecular weight (e.g. small molecule) and gaseous by-products. For example, methyl cellulose can have a molecular weight between 42 to 500 kDa. Xanthan gum has a molecular weight of 300 kDa to 8 MDa.

The additives for use in the composition of the invention are compatible with rubber, such that they do not undergo phase separation in the bulk phase and thus remain blended throughout the rubber composition. In some embodiments of the invention, the additives are evenly dispersed throughout the rubber.

In one embodiment, the composition of the invention comprises at least one polysaccharide in an amount of between 2 and 18 wt % based on the total weight of the composition, such as between 4 and 16 wt %, 6 and 14 wt %, 8 and 12 wt %, or about 10 wt % based on the total weight of the composition. In one embodiment, the composition of the invention comprises methyl cellulose is present in an amount of between 1 to 9 wt % based on the total weight of the composition, such as between 2 and 8 wt %, 3 and 7 wt %, 4 and 6 wt %, or about 5 wt % based on the total weight of the composition. In one embodiment, the composition of the invention comprises xanthan gum in an amount of between 1 to 9 wt % based on the total weight of the composition, such as between 2 and 8 wt %, 3 and 7 wt %, 4 and 6 wt %, or about 5 wt % based on the total weight of the composition.

Particularly preferred embodiments of the invention include a mixture of methyl cellulose and xanthan gum as the at least one additive that promotes the biodegradation of rubber. It was found that this particular combination had further advantages, including that the xanthan gum prevents the methyl cellulose from undergoing swelling when water is added to the dispersion. It is believed that xanthan gum improves the dispersion of the methyl cellulose in the vegetable oil, which prevents the methyl cellulose swelling when water is added to the vegetable oil dispersion. Furthermore, this particular combination of additives was found to be particularly stable when coated onto a container, such that no perceptible change in the taste of the contents (water) of the container could be detected.

It is believed that the combination of methyl cellulose and xanthan gum also provides increased colloidal stability to the aqueous rubber dispersion of the invention. Furthermore, when using the method of preparing and disposing the aqueous dispersion of the invention onto a fibrous substrate, these additives were found to be evenly distributed throughout the resulting rubber coating.

Other Components

The compositions of the invention may comprise further additional components. In one embodiment, the composition of the invention comprises at least one wax. In some embodiments the wax is emulsifying wax, or an animal waxes such as bees wax, Chinese wax, lanolin, shellac wax, squalene, or spermaceti, or a plant wax such as rice balm wax, or those derived from *Copernicia cerifera*, *Simmondsia chinensis*, or *Myrica pensylvanica*, or a combination thereof. In some embodiments of the invention, the wax may be a modified plant or animal wax. In some embodiments, the wax may be a microbial wax, i.e. a wax produced by a bacteria.

The wax of the invention can serve multiple purposes within the composition of the invention. The wax, for example an emulsifying wax, can be used to facilitate formation of a stable aqueous rubber dispersion comprising the composition of the invention.

When the composition of the invention is to be sprayed onto a fibrous substrate, an aqueous rubber dispersion must first be made. Emulsifying wax assists in the stability of the rubber in the aqueous phase, by enhancing the colloidal stability of the rubber dispersion by reducing the rate of phase separation of the rubber and other components from the aqueous phase. Thus, use of an emulsifying wax can increase the storage life of the aqueous rubber dispersion of the invention. For example, in some embodiments, the aqueous rubber dispersion of the invention is stable under ambient conditions for up to one month, for example up to two months, up to three months, or up to six months.

Waxes for use in the invention can also contribute to the barrier properties provided by the composition of the invention, for example, once the composition has been coated onto a fibrous substrate.

In an embodiment of the invention, the composition further comprises a vegetable oil. Similar to the waxes that may be incorporated into the composition of the invention, vegetable oil contributes to the colloidal stability of the aqueous rubber dispersion of the invention. Examples of vegetable oils suitable for use in the composition of the invention include rapeseed oil, olive oil, palm oil, rice bran oil, soybean oil, sunflower oil, cotton seed oil, coconut oil, linseed oil, brazil nut oil, hazelnut oil, grape seed oil, corn oil, carapa oil, sesame oil, or peanut oil.

In one embodiment, the composition of the invention comprises an emulsifying agent in an amount of between 1 and 4 wt % based on the total weight of the composition, such as between 1.2 and 3.8 wt %, 1.5 and 3.5 wt %, 2 and 3 wt %, or about 2.5 wt % based on the total weight of the composition. In a preferred embodiment, the emulsifying agent is emulsifying wax.

In one embodiment, the composition of the invention comprises vegetable oil in an amount of between 4 and 14 wt % based on the total weight of the composition, such as between 5 and 13 wt %, 6 and 12 wt %, 7 and 11 wt %, 8 and 10 wt %, or about 9 wt % based on the total weight of the composition.

Fibrous Substrate Comprising a Rubber Coating

The composition of the invention can be applied to fibrous substrates in order to provide a fibrous substrate comprising a coating, wherein the coating provides a barrier to oxygen and moisture. Coating a fibrous substrate with the composition of the invention thus allows the fibrous substrate to be used for containing food stuffs (e.g. water) and also personal care and cleaning products.

The present invention therefore also provides a fibrous substrate comprising a coating composition comprising a rubber and at least one additive that promotes biodegradation of rubber. Fibrous substrates suitable for use with the present invention include sugar cane fibre, wood fibres such as paper or bamboo fibres, or a combination thereof. In one embodiment of the invention, the fibrous substrate is paper.

There are many sources of paper suitable for use as the fibrous substrate of the invention, for example paper can be obtained from mill broke or internal mill broke waste, which incorporates any substandard or grade-change paper made within the paper mill itself that goes back into the manufacturing system to be re-pulped back into paper. Such out-of-specification paper is not sold and is therefore often not classified as genuine reclaimed recycled fibre, however most paper mills have been reusing their own waste fibre for many years, long before recycling became popular.

An alternative source of paper is from pre-consumer waste, which is offcut and processing waste, such as guillotine trims and envelope blank waste. Pre-consumer waste is generated outside the paper mill and could potentially go to landfill. It is a genuine recycled fibre source and includes de-inked waste, including recycled material that has been printed but did not reach its intended end use, such as waste from printers and unsold publications.

Another alternative is post-consumer waste, which is fibre from paper that has been used for its intended end-use and includes office waste, magazine papers and newsprint. As the vast majority of this material has been printed, either digitally or by more conventional means, such as lithography or rotogravure, it will either be recycled as printed paper or go through a de-inking process first.

In one embodiment of the invention, the fibrous substrate is derived from dyed post-consumer waste.

Recycled paper for use as the fibrous substrate of the invention can be made from 100% recycled materials or a mixture of recycled materials blended with virgin pulp, although 100% recycled materials are (generally) not as strong nor as bright as papers made from the latter. The process of waste paper recycling most often involves mixing used/old paper with water and chemicals to break it down. It is then chopped up and heated, which breaks it down further into strands of cellulose. The resulting mixture is called pulp. The pulp is strained through screens, which remove any glue or plastic (especially from plastic-coated paper) that may still be present in the mixture, before it is cleaned, de-inked, bleached, and mixed with water. Such paper pulp is suitable for use in the manufacture of fibrous substrates for use in the present invention.

Coating Layer Thickness

The remarkable barrier properties of natural rubber mean that the thickness of the layer of coating of the composition of the invention onto fibrous substrates can be reduced whilst maintaining acceptable levels of performance, i.e. maintaining barrier properties suitable for use in containers for food stuffs (e.g. water). Accordingly, in one embodiment of the present invention, the thickness of the layer of the composition on the fibrous substrate is between 10 µm and 2000 µm, such as between 20 µm and 1800 µm, 50 µm and 1500 µm, 1000 µm and 2000 µm, 100 µm and 1000 µm, 100 µm and 500 µm, 50 µm and 300 µm, 50 µm and 200 µm, or between 50 µm and 100 µm.

Those skilled in the art will appreciate that substantially uniform thickness means that the standard deviation of the thickness of the coating is less than 50% of the mean thickness, such as less than 20% of the mean thickness.

Reducing the thickness of the layer of coating has several advantages, including that less composition is required in the manufacture of the coated fibrous substrate of the invention. In addition, a thinner layer of coating composition will provide an item that will undergo faster biodegradation when composted, having a lower biodegradation half-life.

The thickness of the lining of the invention can be made much thinner than the thickness of conventional plastic bottles (e.g. PET bottle—e.g. 0.8-1.0 mm).

Forms of the Substrate

The coated fibrous substrate of the invention may take a multitude of forms, including that of a container. Containers within the scope of the present invention include comprising a bottle, a tub, a soap dispenser, a cup, a jar, a can. In one embodiment of the invention, the fibrous substrate is in the form of a bottle.

When in the form of a container, the composition of the invention ideally coats the entire interior surface of the fibrous substrate, in order to ensure that the any part of the container that comes into contact with food stuffs has sufficient barrier properties.

In one embodiment, the container of the invention further comprises a printed label. In one embodiment, the container of the invention further comprises a cap.

The present invention is not limited to fibrous substrates in the form of containers and therefore includes fibrous substrates in other forms, such as sheets or rolls.

Aqueous Rubber Dispersion

The present invention provides an aqueous rubber dispersion comprising at least one additive that promotes biodegradation of rubber.

In one embodiment of the invention, the aqueous rubber dispersion comprises water in an amount between 5 to 25 wt % based on the total weight of the composition, such as between 8 and 22 wt %, 10 and 20 wt %, 12 and 18 wt %, 14 and 16 wt %, or about 15 wt % based on the total weight of the aqueous rubber dispersion.

In one embodiment of the invention, the aqueous rubber dispersion comprises rubber in an amount between 50 and 90 wt %, at least one polysaccharide in an amount between 2 and 18 wt %, and optionally an emulsifying wax in an amount between 1 and 4 wt % and a vegetable oil in an amount between 4 and 14 wt % based on the total weight of the aqueous rubber dispersion. In one embodiment of the invention, the aqueous rubber dispersion comprises rubber in an amount between 60 and 70 wt %, at least one polysaccharide in an amount between 6 and 10 wt %, and optionally an emulsifying wax in an amount between 1.5 and 2.5 wt % and a vegetable oil in an amount between 6 and 8 wt % based on the total weight of the aqueous rubber dispersion.

In one embodiment, the aqueous rubber dispersion of the invention comprises rubber in an amount of between 50 to 90 wt % based on the total weight of the aqueous rubber dispersion, such as between 60 and 80 wt %, 65 and 75 wt %, 65 and 70 wt %, or about 67 wt % based on the total weight of the aqueous rubber dispersion.

In one embodiment, the aqueous rubber dispersion of the invention comprises at least one polysaccharide in an amount of between 2 and 14 wt % based on the total weight of the composition, such as between 4 and 12 wt %, 6 and 10 wt %, 7 and 9 wt %, or about 8 wt % based on the total weight of the aqueous rubber dispersion. In one embodiment, the aqueous rubber dispersion of the invention comprises methyl cellulose is present in an amount of between 1 to 7 wt % based on the total weight of the composition, such as between 2 and 6 wt %, 3 and 5 wt %, or about 4 wt % based on the total weight of the aqueous rubber dispersion. In one embodiment, the aqueous rubber dispersion of the invention comprises xanthan gum in an amount of between 2 and 6 wt %, 3 and 5 wt %, or about 4 wt % based on the total weight of the aqueous rubber dispersion.

It will be appreciated that whilst water is the medium for making the aqueous rubber dispersion of the invention, other solvents may also be present in the dispersion. Said other solvents include alcohols, such as ethanol, propanol (e.g. isopropanol), or butanol, organic acids such as acetic acid, propanonic acid, formic acid, benzoic acid, citric acid, or lactic acid, or combinations thereof.

Method of Making an Aqueous Rubber Dispersion

The present invention also provides a method of making an aqueous rubber suspension comprising at least one additive that promotes the biodegradation of rubber. The method comprises the steps of dispersing in water at least one additive that promotes biodegradation of rubber, adding rubber to the dispersion and stirring.

In embodiments of the invention where the aqueous rubber dispersion comprises additional components, for example components that enhance the colloidal stability of the aqueous rubber dispersion (e.g. a wax), these additional components can be added either with or after the addition of the at least one additive that promotes biodegradation of rubber. These additions components are preferably added before the addition of rubber to the aqueous dispersion. For example, in one embodiment of the invention, emulsifying wax and a vegetable oil are added to the dispersion with the at least one additive.

In some embodiments of the invention, the method further involves the step of heating and stirring the aqueous rubber dispersion after addition of the at least one additive and any additional components. For example, the dispersion may be heated at at least 40° C., such as at least 50° C., at least 60° C., at least 70° C., at least 80° C., or at least 90° C.

Method of Coating a Fibrous Substrate

The present invention also provides a method of coating a fibrous substrate with a composition comprising a rubber and at least one additive that promotes the biodegradation of rubber. The method of the invention comprises the steps of providing a fibrous substrate with at least one surface, depositing an aqueous rubber dispersion comprising at least one additive that promotes the biodegradation of rubber onto the at least one surface of the fibrous substrate to form a layer of coating, then drying the fibrous substrate and layer of coating.

Techniques for spraying aqueous dispersions are known in the art. In one embodiment of the invention, compressed air-assisted spraying is used. The spraying technique employed can be selected depending on the form of the fibrous substrate to be coated. For example, when the fibrous substrate is in the form of a container, such as a bottle, a compressed air-assisted spraying technique can be used. A 350° nozzle may be employed to ensure that a layer of coating is applied to the complete surface of the interior of the container.

Alternative techniques may also be employed to coat the aqueous rubber dispersion of the invention onto a fibrous substrate. For example, in one embodiment of the invention, the aqueous rubber dispersion is coated onto the fibrous substrate by contacting the fibrous substrate with the aqueous rubber dispersion in the bulk liquid phase. For example, wherein the fibrous substrate is in the form of a container, an embodiment of the method of the invention comprises filling the container with the aqueous rubber dispersion of the invention, so as to coat the entire interior surface area of the container. Excess aqueous rubber dispersion is then removed from the container by inverting the container and pouring the dispersion out, leaving a thin film of the rubber composition of the invention on the entire interior surface of the container.

Once the aqueous rubber dispersion has been coated onto the fibrous substrate, the fibrous substrate and layer of coating is then dried. Whilst drying can be performed at ambient conditions, the fibrous substrate and coating may also be dried by heating. For example, in one embodiment of the invention, the method further comprises heating the fibrous substrate and the layer of coating at at least 50° C., at 80° C., at least 100° C., at least 150° C., at least 180° C., at least, or at least 200° C. Heating can be performed for up at 120 seconds, up to 80 seconds, up to 60 seconds, up to 30 seconds, up to 15 seconds, or up to 10 seconds.

Pre-Treating the Aqueous Rubber Dispersion

To ensure that the coating of the fibrous substrate is sterilised and therefore suitable for contacting food stuffs and/or personal care products, the aqueous rubber dispersion of the invention can undergo pre-treatment before being sprayed onto the surface of the fibrous substrate.

In one embodiment of the invention, the aqueous rubber dispersion is filtered through a fine-mesh filter, which removes any particulate contaminants. For example, the aqueous rubber dispersion may be filtered through a mesh with a mesh diameter of up to 1 mm, such as 0.5 mm, 0.25 mm, 0.125 mm, 0.074 mm, 0.044 mm, or 0.002 mm. In one embodiment of the invention, the aqueous rubber dispersion is filtered through at least one fine-mesh filter, such as at least two, at least three, at least four, at least five, at least six, or at least ten fine-mesh filters.

In one embodiment of the invention, pre-treatment of the aqueous rubber dispersion involves exposing the dispersion to irradiation, to kill any microorganism present such as bacteria or fungi. In one preferred embodiment of the invention, the aqueous rubber dispersion is irradiated with UV-radiation from a suitable UV-radiation source. This technique may include using ultraviolet germicidal irradiation (UVGI), a technique known in the art of food, water, and air purification. UVGI involves irradiating microorganisms with short wavelength ultraviolet light (UV-C).

Those skilled in the art will appreciate that different irradiation sources may be used for sterilising the aqueous rubber dispersion of the invention, including ionizing radiation, such as gamma rays, X-rays, or electron beams, using suitable radiation sources.

In one embodiment of the invention, the aqueous rubber dispersion is exposed to multiple sources of radiation, for example at least two, at least three, at least four, at least six, or at least ten sources of radiation. In one embodiment of the invention, the aqueous rubber dispersion is exposed to at least four UV-radiation sources.

In one embodiment of the invention, the aqueous rubber dispersion is filter through at least one fine-mesh filter, such as two fine-mesh filters and is exposed to at least one source of UV-irradiation, such as four UV-irradiation sources.

Method of Making a Fibrous Container for Use with the Invention

The following description concerns the manufacture of moulded fibrous articles from paper pulp. However, articles made from alternative materials and the methods of making the same are also within the scope of the invention.

One method for producing moulded paper articles from paper pulp involves forming an aqueous suspension of paper fibres, and deposited said paper fibers into a screened mould, wherein the mould may comprise small perforations to allow water to be removed from the pulp. A vacuum may then be applied such that the fibres form a fibre-mat which starts to develop strength. After this step, the moulded preform typically reaches 50 wt % solids. The moulded preform is then completely dried out in a heated mould or an oven.

The manufacturing stages that can be used in the production of paper pulp products are provided:

1. Mixing: the raw material is soaked in water and mixed until the desired pulp consistency has been achieved. Additives, such as sizing agents or fillers commonly utilised also in the paper-making industry may be introduced.
2. Forming the pulp part is formed to shape by custom designed tools. The tools consist of a metal net supported by a perforated mould. The machine is lowered into the slurry and the water is pulled through the metal mesh by applying a vacuum. The suction helps to bind the fibres.
3. Drying: The moulded preform is then dried in an oven.
4. Trimming and quality inspection: protruding edges are trimmed and all the scraps or rejected products are returned to the pulp mixture and re-used. For specialty products, the produced parts can undergo some further processes, such as debossing or special treatments.

Various alternative methods for making fibrous containers are known in the art.

Additional Steps in the Method of Making a Container of the Invention

Once coated, those skilled in the art will appreciate that additional steps can be conducted in order to make the container ready for use. Such steps include printing, for example digitally printing an image onto the exterior of the bottle. In one embodiment of the invention, the method of making a container further involves the step of screen printing. In method, the container, e.g. a bottle, is placed on rollers and therefore screen printing can be conducted uniformly on each bottle, in a method that is both quick and cheap.

The method of making the containers of the invention may also comprise trimming and quality inspection, wherein any protruding edges of the container are trimmed. Any scraps or rejected products can be returned to the pulp mixture and re-used.

The method of making the containers of the invention may also comprise debossing and other special treatments. For example, the method may comprise the use of a mould with a logo embossment, such that when the container is formed in the mould, an embossed logo of complementary shape is formed on the bottle. The logo embossment on the mould can be in the form of a protrusion, such that the complementary logo on the bottle is in the form of an indentation. Alternatively, the logo embossment on the mould can be in the form of an indentation, such that the complementary logo on the bottle is in the form of a protrusion.

Furthermore, the method of making the container of the invention may also comprise the step of adding a cap to the container. Different capping methods are known in the art and are applicable to the present invention.

Once ready, the containers of the invention can be transported using biodegradable materials. For example, the containers may be packed into cardboard boxes, e.g. 6, 12, 18, or 24 bottles per box, and the boxes secured with twine. As the materials used in the transportation process are also biodegradable, they may be used in the manufacture of the containers of the invention.

EXAMPLES

Example 1: Preparation of an Aqueous Rubber Dispersion of the Invention

The following components where used in the preparation of the aqueous rubber dispersion of the invention.
Material %

| Component | Amount (weight %) |
| --- | --- |
| Distilled water | 15.38 |
| Guayule-derived natural rubber | 67.20 |
| Methylcellulose | 4.12 |
| Xanthan E 415 | 3.80 |
| Emulsifying wax | 2.00 |
| Vegetable oil | 7.50 |

A dispersion of methyl-cellulose and xanthan gum is first made in a vegetable oil, the mixture is then stirred to produce a dispersion. The dispersion is mixed with distilled water and heated. The emulsifying wax is added and the dispersion mixed until the wax dissolves. The natural rubber mix is then added to the dispersion and the dispersion stirred. The aqueous rubber dispersion is now ready for application to a fibrous substrate. In this state (and when kept in an airtight container) the aqueous rubber dispersion may last up to three months without spoiling (i.e. undergoing phase separation).

Example 2: Application of Aqueous Rubber Dispersion of the Invention to a Fibrous Substrate Referring to FIG. 1, there is a system 1 for coating the inside wall of a container, such a bottle 3, with the liner described herein. In this example, the fibrous substrate to which a layer of the composition of the invention is applied, is a biodegradable bottle 3, e.g. a bottle made from paper (i.e. cellulosic) fibres. The aqueous rubber dispersion of the present invention creates a biodegradable lining for the biodegradable bottle, said lining providing a barrier to oxygen and moisture. Once covered with said lining, the paper bottle 3 is suitable for storing food stuffs and personal care and cleaning products.

Those skilled in the art will appreciate that the disclosed methodology could be used to coat other fibrous substrates with a layer of the composition of the invention.

The aqueous rubber dispersion (e.g. from example 1) is introduced into a liner store 5 and pressurised. During application of the composition to the fibrous substrate, the aqueous rubber dispersion flows from the liner store and through a liner filtration and sterilisation filter system 7. The filtration process consists of two phases of fine-mesh filters 9, 11 that ensure no contaminants enter the final aqueous rubber dispersion to be applied to the bottle 3. In addition, the aqueous rubber dispersion is exposed to a series of ultraviolet (UV) lights 13 that kill all bacteria, mould, and fungus that may be present in the aqueous rubber dispersion, such that the lining of the biodegradable bottle 3 is sterile.

The system 1 is partnered with a compressed air system 15, which runs through a similar filtration system 7. This ensures that both the compressed air and the liner solution are free from any contaminants that could jeopardise the integrity of the packaging and its contents. The compressed air and the liner mix is then combined via a combination valve 17 and is ready for application.

The applicator 19 consists of a line in (containing the liner and compressed air), trigger system 21 and a 350° spray nozzle 23. It can be used manually or automated by a simple timer and lever system. The 350° spray nozzle 23 ensures that the aqueous rubber composition of the invention is applied to the entirety of the internal surface of the bottle 3.

Once the inside of the bottle 3 is coated with the aqueous rubber dispersion, the water in the aqueous rubber dispersion is drawn into the paper and dries. A thin layer of liner is therefore left on the inside of the bottle 3. The bottle 3 can either be dried under ambient conditions, or it can enter a conveyor oven for a 10-12 seconds at 180° C. to allow the liner to dry faster.

Once dried, the inside of the packaging is completely sealed and water tight. This allows us to utilise the bottle as you would conventional petrochemically-derived (e.g. PET) packaging.

The invention claimed is:

1. A biodegradable bottle comprising a structural layer, wherein the structural layer comprises a fibrous substrate comprising at least one surface, wherein the at least one surface comprises a layer of coating, wherein the coating comprises a rubber and at least one additive that promotes biodegradation of rubber.

2. The biodegradable bottle of claim 1, wherein the rubber has a low crosslink density or is uncrosslinked.

3. The biodegradable bottle of claim 1, wherein the rubber is natural rubber.

4. The biodegradable bottle of claim 1, wherein the at least one additive that promotes biodegradation comprises a polysaccharide, wherein the polysaccharide is selected from a group comprising cellulose, a cellulose derivative, xanthan gum, a starch, hemicellulose, glycogen, pectin, or combinations thereof.

5. The biodegradable bottle of claim 1, wherein the at least one additive that promotes biodegradation comprises methyl cellulose, xanthan gum, or a combination thereof.

6. The biodegradable bottle of claim 1, wherein the coating further comprises at least one wax, wherein the at least one wax is selected from the group comprising animal waxes, plant waxes, modified plant or animal waxes, or combinations thereof.

7. The biodegradable bottle of claim 1, further comprising at least one wax that is an emulsifying wax.

8. The biodegradable bottle of claim 1, wherein all components of the coating are food safe.

9. The biodegradable bottle of claim 1, wherein rubber is present in the coating in an amount between 65 to 95 wt % based on the total weight of the composition.

10. The biodegradable bottle of claim 1, wherein the at least one additive that promotes biodegradation of rubber is present in the coating in an amount between 2 and 18 wt % based on the total weight of the composition.

11. The biodegradable bottle of claim 1, further comprising a methyl cellulose in the coating in an amount between 1 to 9 wt % based on the total weight of the composition.

12. The biodegradable bottle of claim 1, further comprising a xanthan gum in the coating in an amount between 1 to 9 wt % based on the total weight of the composition.

13. The biodegradable bottle of claim 1, wherein the coating further comprises an emulsifying agent in an amount of between 1 and 4 wt % based on the total weight of the composition.

14. The biodegradable bottle of claim 1, wherein the coating further comprises a vegetable oil in an amount between 4 and 14 wt % based on the total weight of the composition.

15. The biodegradable bottle of claim 1, wherein the fibrous substrate comprises sugar cane fibres, wood fibres, or combinations thereof.

16. The biodegradable bottle of claim 1, wherein the thickness of the layer of coating is between 10 μm and 2000 μm.

17. The biodegradable bottle of claim 1, wherein the layer of coating completely covers the interior surface of the bottle.

18. A method of making the biodegradable bottle of claim 1, comprising:
  a) providing a biodegradable bottle with at least one surface;
  b) depositing an aqueous rubber dispersion comprising a rubber and at least one additive that promotes biodegradation of rubber on the at least one surface to form a layer of coating; and
  c) drying the biodegradable bottle and layer of coating.

19. The method of claim 18, wherein before b), the method further comprises filtering the aqueous rubber dispersion, wherein the aqueous rubber dispersion is filtered between at least one fine-mesh filter, and
  wherein before b), the method further comprises exposing the aqueous rubber dispersion to a source of irradiation, wherein the source of irradiation is ultraviolet (UV)-irradiation.

20. The method of claim 18, wherein c) comprises heating the biodegradable bottle at least 50° C.: wherein the heating is performed for up to 120 seconds.

* * * * *